Figure 3:
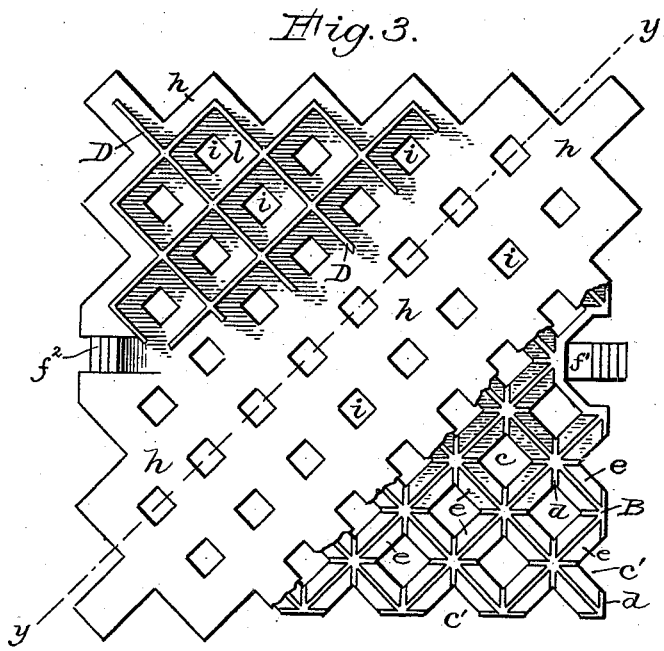

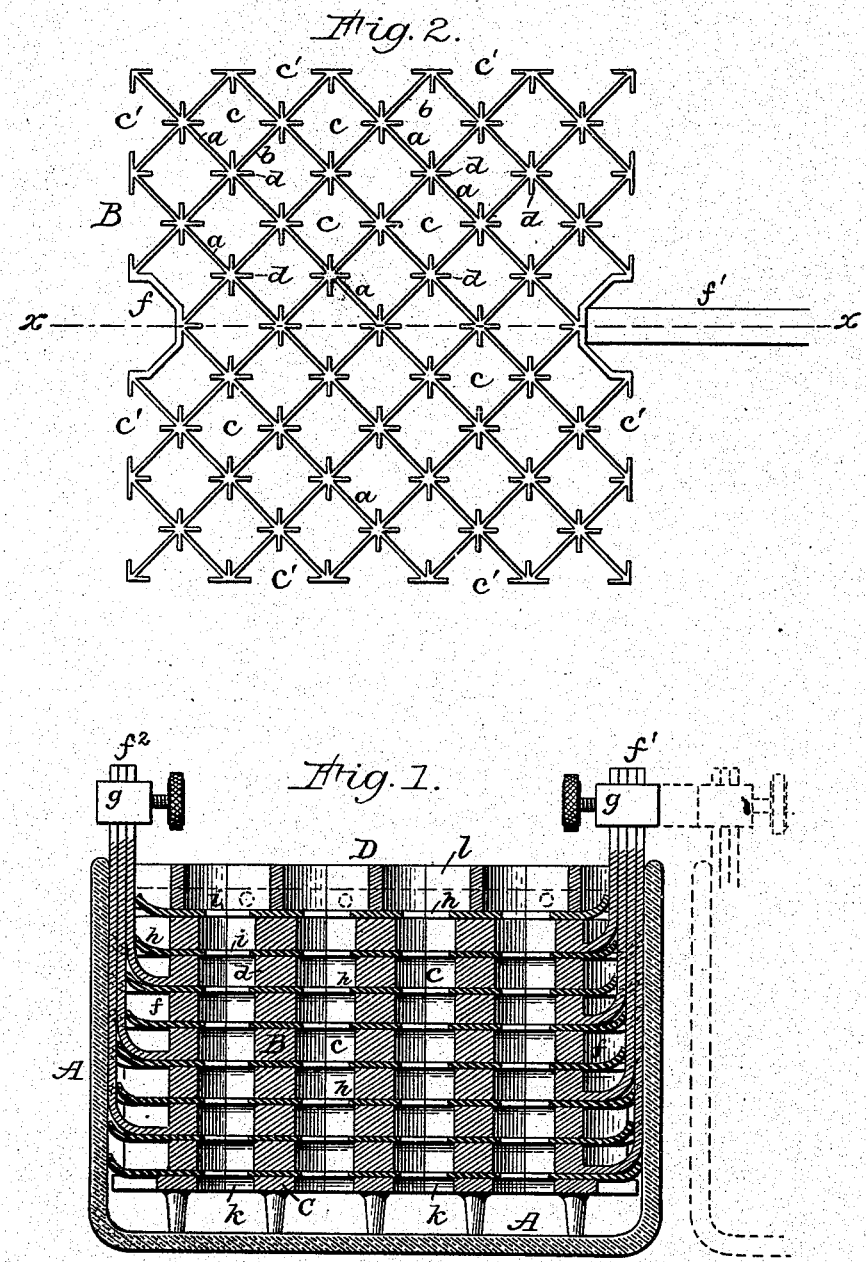

(No Model.) 2 Sheets—Sheet 2.

R. EICKEMEYER.
SECONDARY BATTERY.

No. 486,094. Patented Nov. 15, 1892.

Attest:
Philip F. Larner
Howell Bartle

Inventor:
Rudolf Eickemeyer
By Wm. ... Attorney.

UNITED STATES PATENT OFFICE.

RUDOLF EICKEMEYER, OF YONKERS, NEW YORK.

SECONDARY BATTERY.

SPECIFICATION forming part of Letters Patent No. 486,094, dated November 15, 1892.

Application filed April 4, 1890. Serial No. 346,511. (No model.)

*To all whom it may concern:*

Be it known that I, RUDOLF EICKEMEYER, of Yonkers, in the county of Westchester and State of New York, have invented certain new and useful Improvements in Secondary or Storage Batteries; and I do hereby declare that the following specification, with accompanying drawings, is a clear, true, and complete description of my invention.

The objects of my present improvements are to secure the advantages due to battery plates which are wholly submerged in battery fluid, together with a complete protection of the metallic lead of which the grids or frames of the plates are composed, and so as to securely afford extensive areas of the applied porous material and avoid liability of short-circuiting, and also to secure a compact battery of high efficiency and of comparatively-light weight.

After describing in detail one of my improved batteries as illustrated in the drawings, the features deemed novel will be specified in the several clauses of claim hereunto annexed.

Figure 4:
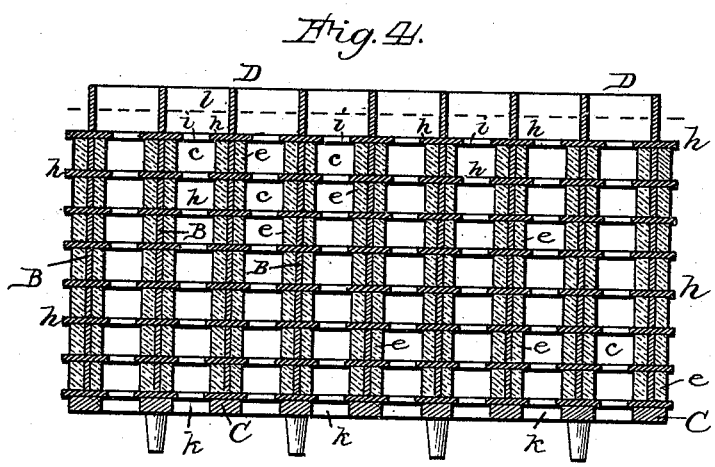

Referring to the drawings, Figure 1 illustrates in lateral vertical section one of my improved batteries and the mode of coupling one with another is illustrated in dotted lines. Fig. 2 is a top view of one of the grids or frames composed of metallic lead, the dotted line $x$ indicating the section-line of Fig. 1. Fig. 3 is a plan view showing a portion of a top plate, a portion of an insulating-sheet, and a portion of one of the grids or frames with the active porous material applied thereto. Fig. 4 is a view of the battery without its cell in vertical section on the diagonal line $y$, Fig. 3.

The cell A, Fig. 1, may be composed of any suitable material, and it may be varied in form, so that it may properly receive the battery elements. As here shown, it is adapted to receive a series of square battery-plates arranged horizontally and piled one above another.

The several grids or frames B, composed of metallic lead, are counterparts, and one of them is shown in plan view in Fig. 2. Each of these grids or frames is cast in one piece in a suitable mold, so as to develop a series of thin webs $a$ and $b$, arranged diagonally to each other and affording numerous square openings or spaces $c$, at the corners of which there are short radiating webs $d$. The sides or walls of these openings, which extend through the plate or from side to side, are coated or charged with the usual porous active material $e$, and each mass of said material is securely confined and held at its ends by the adjacent short radiating webs $d$, each of said masses being, therefore, in the form of a dovetailed tenon within a dovetailed mortise afforded by the one side of a web $a$ or $b$ and the two adjacent short radiating webs $d$, as clearly indicated in Fig. 3. It will be seen that at the edges of the frame or grid there are a series of angular recesses or spaces $c'$, each being one-half of a square and all conforming to the adjacent interior squares or openings $c$, and also that at the two sides each of these recesses is coated with the active material $e$, thus leaving uncovered only those portions of the edges of the grid or frame which lie between said angular recesses $c'$, and said portions of the metallic lead may be readily protected by means of varnish, coal-tar, or other suitable material. The metallic lead, being thus disposed in vertical webs, affords a grid or frame of comparatively-light weight, but of desirable rigidity, and the bulk of active material and its area of exposure is much greater in proportion to the size and weight of the frame than with any other construction known to me. Each frame has at one side thereof a recess $f$ and at its opposite side a terminal conductor, which is flexible and integral with the frame, and the several frames are counterparts, so that by arranging them alternately the opening in any plate will register with those of the others, and the terminals $f'$ when bent upwardly will occupy the recesses $f$ and constitute one polar arrangement and the terminals $f^2$ the other. As shown in the drawings, seven grids or frames are employed, with four of the terminals at one side and three at the other, and they are confined at their tips, respectively, by means of suitable binding clamps or posts $g$, these latter, when double, enabling the ready and convenient coupling of any one battery with another, as indicated in dotted lines in Fig. 1. The several battery-plates are insulated from each other by means of interposed sheets $h$, which may be composed of thin flexible vulcanized rubber, slitted at the sides to accommodate the terminals. Said sheets are provided with a series of square openings or holes $i$, which register centrally with the square spaces or openings in the battery-plates; but said holes are much smaller than said spaces, so that the active material on any one plate is thoroughly separated from the active material on the plates above and below, even should some of said material become detached.

The several submerged battery-plates are supported upon a base-plate C, provided with posts or legs resting upon the bottom of the cell A, thus affording ample space for the battery fluid and for the reception of detached active material. This base-plate is provided with openings $k$, registering with those in the battery-plates, so that the battery fluid freely occupies all of the spaces in the plates and those adjacent to the edges thereof, and hence it is in complete contact with all of the active material.

On top of the upper insulating-sheet $h$ there is a cap-plate D, having a series of openings $l$, which communicate with the several openings or fluid-spaces in the pile of battery-plates, and thence with the space below the base-plate. This cap-plate serves a good purpose in properly controlling the upper portion of the battery fluid against splashing to and fro, as is liable when batteries are used on cars or vessels, the walls of each opening or space $l$ preventing all undue movements of the fluid. A dotted line across the cap-plate in Fig. 4 indicates the height to which the fluid should be supplied, and for securing an equalizing circulation thereof near the top of the battery each of the partitions between the openings $l$ may be provided below said dotted lines with ducts or passages.

For securing the best results I employ a battery constructed and arranged as shown; but it will be obvious that the prime value of my improvement does not depend upon the exact form of the fluid-spaces nor upon the diagonal arrangement of square openings in the plates nor upon the short dovetailing webs—as, for instance, if the square openings be arranged symmetrically with the edges of the plate, said edges may, nevertheless, be coated with the active material; and also if, instead of square openings, they be polygonal in form, there will be similar recesses at the edges of the plate to be coated with the active material, and in some cases the latter will not need the retaining service of the short webs. However the construction of the battery may be varied in these respects, it will be seen that the metallic lead will be well protected and that the small proportion of lead to the active material will afford an efficient battery of comparatively light weight, very compact, economical in construction, and free from all liability of short-circuiting.

Having thus described my invention, I claim as new and desire to secure by Letters Patent—

1. In a secondary or storage battery, the combination, substantially as hereinbefore described, of a suitable cell or receptacle and battery-plates arranged in a pile, insulated from each other, each plate having openings through it from side to side and each of said openings registering with corresponding openings in the other plates and affording spaces for occupation by the battery fluid.

2. In a secondary or storage battery, the combination, substantially as hereinbefore described, of a suitable cell or receptacle and counterpart battery-plates piled in said cell, insulated from each other by thin sheets of interposed insulating material, and each plate consisting of a grid or frame of metallic lead, provided with a series of openings through it from side to side and having active material applied to the sides of all of said openings and also at the edges of the plate, whereby an extensive area of active material is afforded with but little metallic lead, and the latter well protected by said insulating material, although submerged in battery fluid.

3. In a secondary or storage battery, the combination, substantially as hereinbefore described, of a suitable cell or receptacle and horizontally-arranged counterpart battery-plates in a pile and provided with openings which register with each other from top to bottom of the pile, and each plate at one edge thereof provided with a flexible integral lead extension to serve as an upwardly-turned terminal, said plates being insulated by thin sheets of insulating material from each other in said pile and alternated in position for grouping the terminals of alternating plates at appropriate sides of the battery.

4. In a secondary or storage battery, the combination, substantially as hereinbefore described, of a suitable cell or receptacle, a horizontal base-plate within the cell, elevated above its bottom and provided with a series of openings, a pile of battery-plates insulated from each other, each provided with a series of openings the sides of which are coated with active material, the openings in each plate registering with corresponding openings in other battery-plates and also with those in the base-plate, each set of registering openings serving as a space for battery fluid, communicating with the fluid-space beneath the base-plate and affording a passage for detached active material to the bottom of the cell.

5. In a secondary or storage battery, the combination, with the cell and a series of piled battery-plates having registering openings lined with active material, of a cap-plate having corresponding openings, substantially as described, for controlling the battery fluid against undue splashing movements.

6. A storage-battery plate composed of a leaden grid or frame provided with a series of openings and recessed at its edges to correspond with the outlines of said openings and having active material applied to the sides of all of said openings and also to the sides of the recesses at the edges of the plate, the two sides of said plate being free from said active material, substantially as described.

7. A storage-battery plate composed of a grid or frame of metallic lead having a series of square openings therein, short webs at the corners of said openings, and active material applied to the sides of said openings between said short webs, substantially as and for the purposes described.

RUDOLF EICKEMEYER.

Witnesses:
JAMES S. FITCH,
RUDOLF EICKEMEYER, Jr.